(12) United States Patent
Noh et al.

(10) Patent No.: US 11,233,924 B2
(45) Date of Patent: Jan. 25, 2022

(54) ELECTRONIC DEVICE INCLUDING CAMERA

(71) Applicant: Samsung Electronics Co., Ltd., Suwon-si (KR)

(72) Inventors: Daeyoung Noh, Suwon-si (KR); Sangmin Kim, Suwon-si (KR); Minchang Shim, Suwon-si (KR); Soonwoong Yang, Suwon-si (KR); Seunghoon Lee, Suwon-si (KR); Jongchul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/702,181

(22) Filed: Dec. 3, 2019

(65) Prior Publication Data

US 2020/0177771 A1 Jun. 4, 2020

(30) Foreign Application Priority Data

Dec. 3, 2018 (KR) .................... 10-2018-0153660

(51) Int. Cl.
*H04N 5/225* (2006.01)
*H04M 1/02* (2006.01)

(52) U.S. Cl.
CPC ........ *H04N 5/2252* (2013.01); *H04M 1/0264* (2013.01); *H04N 5/2257* (2013.01)

(58) Field of Classification Search
None
See application file for complete search history.

(56) References Cited

U.S. PATENT DOCUMENTS 9,395,602 B2 7/2016 Havskjold et al.
10,547,788 B2 1/2020 Park et al.
(Continued)

FOREIGN PATENT DOCUMENTS

CN 108040148 A 5/2018
CN 110392187 A 10/2019
(Continued)

OTHER PUBLICATIONS

International Search Report dated Jan. 3, 2020 in connection with International Patent Application No. PCT/KR2019/012383, 3 pages.
(Continued)

*Primary Examiner* — Quan Pham

(57) ABSTRACT

An electronic device including a housing including a first plate, a second plate, and a side member enclosing a space between the first plate and the second plate; and a camera structure disposed at a space at a periphery of the side member. The camera structure includes a camera housing structure disposed between the first plate and the second plate; at least one image sensor disposed in the camera housing structure; and at least one lens disposed inside the camera housing structure between the at least one image sensor and the first plate and facing the first plate. The camera housing structure includes a side surface facing the side member and having a first stepped structure when one surface of the side surface is viewed from the outside. The portion of the side member has a second stepped structure formed to correspond to the first stepped structure.

10 Claims, 14 Drawing Sheets

(56) References Cited

U.S. PATENT DOCUMENTS

| | | | |
|---|---|---|---|
| 2017/0068292 A1* | 3/2017 | Hooton | G06F 1/203 |
| 2017/0351164 A1 | 12/2017 | Kim et al. | |
| 2018/0033571 A1* | 2/2018 | Choi | G06F 1/1671 |
| 2018/0198897 A1* | 7/2018 | Tang | G02B 13/0065 |
| 2018/0213071 A1 | 7/2018 | Bao | |
| 2018/0267390 A1 | 9/2018 | Kim et al. | |
| 2019/0302833 A1* | 10/2019 | Cheng | H04M 1/0264 |
| 2020/0046235 A1 | 2/2020 | Jung et al. | |
| 2021/0051249 A1 | 2/2021 | Zhao et al. | |

FOREIGN PATENT DOCUMENTS

| | | |
|---|---|---|
| KR | 10-2012-0127021 A | 11/2012 |
| KR | 10-2018-0053180 A | 5/2018 |
| WO | 2018/151396 A1 | 8/2018 |

OTHER PUBLICATIONS

Supplementary European Search Report dated Oct. 15, 2021 in connection with European Patent Application No. 19 89 3838, 8 pages.

* cited by examiner

ELECTRONIC DEVICE INCLUDING CAMERA

CROSS-REFERENCE TO RELATED APPLICATION

This application is based on and claims priority under 35 U.S.C. 119 to Korean Patent Application No. 10-2018-0153660 filed on Dec. 3, 2018 in the Korean Intellectual Property Office, the disclosure of which is herein incorporated by reference in its entirety.

BACKGROUND

1. Field

Various embodiments of the disclosure relate to an electronic device including a camera.

2. Description of the Related Art

With significant decreases in the functional gap of each manufacturer of electronic devices, the thickness of an electronic device is gradually becoming slimmer in order match the purchasing desires of the consumer. Meanwhile, differentiated methods for increasing the rigidity of the electronic device are being sought. In order to fully exhibit functions of the electronic device without any increase in volume, a plurality of electronic components may be disposed in an internal space of the electronic device.

The electronic device may include at least one electronic component disposed to expose at least part of an internal space to the outside and capable of performing a function corresponding to an external environment. Such electronic components may include a camera structure for photographing an external subject, an iris sensor used as a security authentication means of an electronic device, an illuminance sensor for performing a corresponding function according to brightness of external light, an ultrasonic sensor, a speaker device, a microphone device, or an earjack assembly. For example, while a camera structure is disposed in a direction facing a front surface of the electronic device, in order to reduce an influence on a large screen display, the camera structure may be disposed at a corner portion of the electronic device. In this case, self-rigidity of a housing of the electronic device may be lowered.

SUMMARY

Various embodiments of the disclosure may provide an electronic device including a camera that can help increase rigidity thereof.

Various embodiments of the disclosure may provide an electronic device including a camera that can assist efficient disposition of peripheral electronic components.

In accordance with an aspect of the disclosure, an electronic device includes a housing including a first plate, a second plate facing in a direction opposite to that of the first plate, and a side member enclosing a space between the first plate and the second plate; and a camera structure disposed at a space at a periphery of a portion of the side member, wherein the camera structure includes a camera housing structure disposed between the first plate and the second plate; at least one image sensor disposed in the camera housing structure; and at least one lens disposed in the camera housing structure between the at least one image sensor and the first plate and facing the first plate, wherein the camera housing structure includes a side surface facing a portion of the side member and having a first stepped structure when one surface of the side surface is viewed from the outside, and wherein the portion of the side member has a second stepped structure formed to correspond to the first stepped structure In accordance with another aspect of the disclosure, an electronic device includes a housing including a first plate, a second plate facing in a direction opposite to that of the first plate, and a side member enclosing a space between the first plate and the second plate; and a camera structure disposed in a space at a periphery of a portion of the side member, wherein the camera structure includes a camera housing structure disposed between the first plate and the second plate; at least one image sensor disposed in the camera housing structure; and at least one lens disposed in the camera housing structure between the at least one image sensor and the first plate and facing the first plate, wherein the camera housing structure includes a camera structure including a side surface facing a portion of the side member and having a first stepped structure when one surface of the side member is viewed from the outside; and at least one electronic component disposed through the first stepped structure at a periphery of the camera structure in the space.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In connection with the description of the drawings, the same or similar reference numerals may be used for the same or similar components.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to accompanying drawings.

Figure 1:
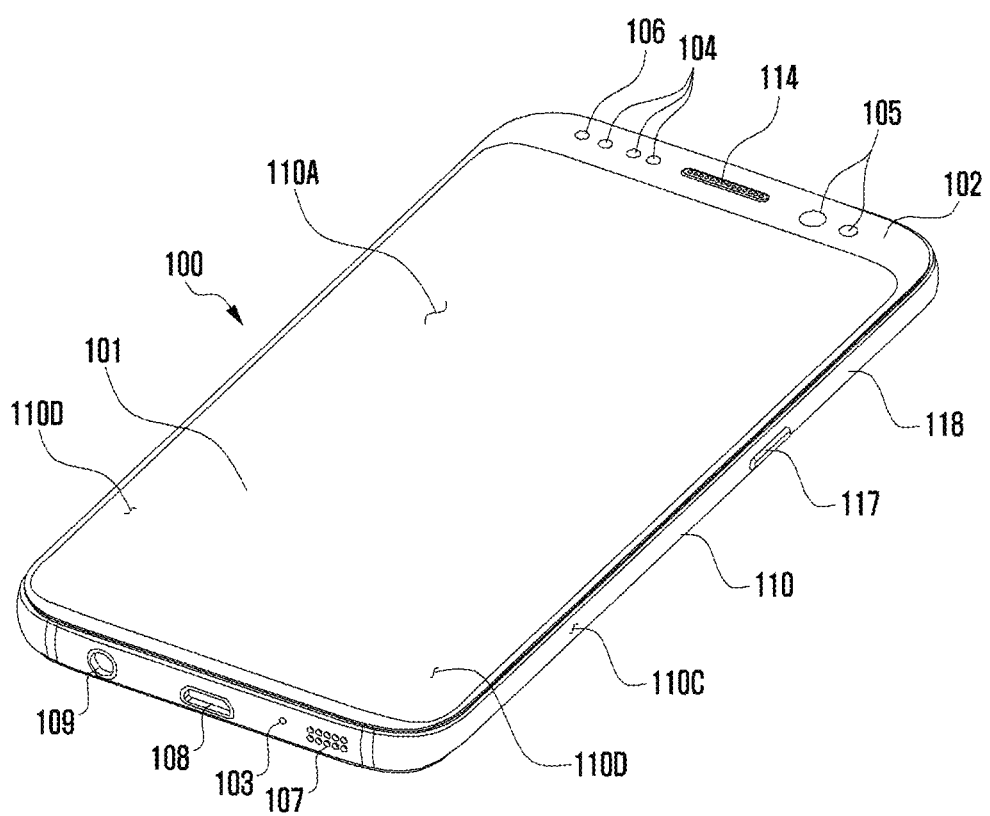
FIG. 1 illustrates a front perspective view of a mobile electronic device according to various embodiments of the disclosure.
Figure 2:
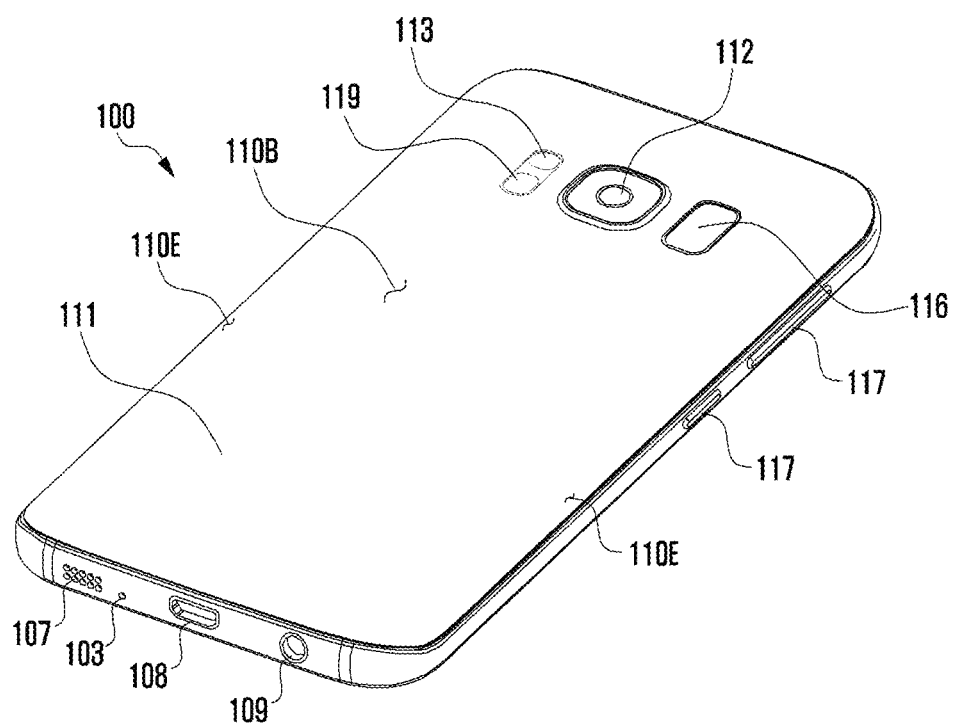
FIG. 2 illustrates a rear perspective view of the electronic device of FIG. 1.

FIG. 1 illustrates a perspective view showing a front surface of a mobile electronic device 100 according to an embodiment, and FIG. 2 illustrates a perspective view showing a rear surface of the mobile electronic device 100 shown in FIG. 1.

Referring to FIGS. 1 and 2, the mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104, 116 and 119, camera modules 105, 112 and 113, a key input device 117, a light emitting device 106, and connector holes 108 and 109. The mobile electronic device 100 may omit at least one (e.g., the key input device 117 or the light emitting device 106) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device 106. At least one of the audio module 114, the sensor module 104, the camera module 105, the fingerprint sensor 116, and the light emitting element 106 may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104, 116 and 119 may generate electrical signals or data corresponding to an internal operating state of the mobile electronic device 100 or to an external environmental condition. The sensor modules 104, 116 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module 116 (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module 116 disposed on the second surface 110B of the housing 110.

The light emitting device 106 may be disposed on the first surface 110A of the housing 110. For example, the light emitting device 106 may provide status information of the electronic device 100 in an optical form. The light emitting device 106 may provide a light source associated with the operation of the camera module 105. The light emitting device 106 may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Figure 3:
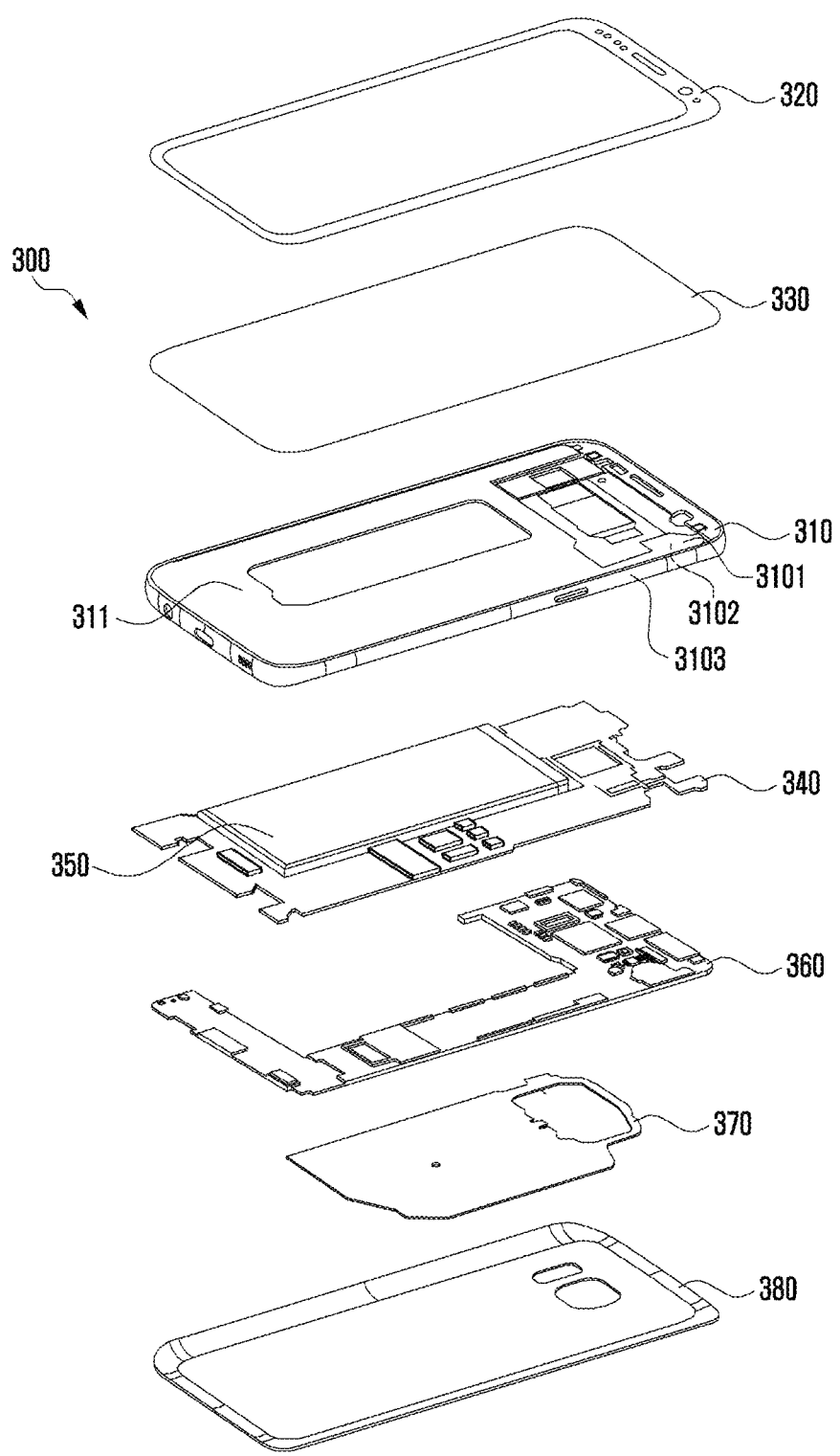
FIG. 3 illustrates an exploded perspective view of the electronic device of FIG. 1.

FIG. 3 illustrates an exploded perspective view showing a mobile electronic device 300 shown in FIG. 1.

Referring to FIG. 3, the mobile electronic device 300 may include a lateral bezel structure 310, a first support member 311 (e.g., a bracket), a front plate 320, a display 330, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

According to various embodiments, the side member 310 may be integrally formed with the first support member 311. According to one embodiment, the side member 310 may include a first surface 3101 facing the front plate 320, a second surface 3102 facing in a direction opposite to that of the first surface 3101 and facing the rear plate 380, and a side surface 3103 enclosing a space between the first surface 3101 and the second surface 3102. According to an embodiment, the first support member 311 may be formed to extend in an internal space direction of the electronic device 300 from the side surface.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4:
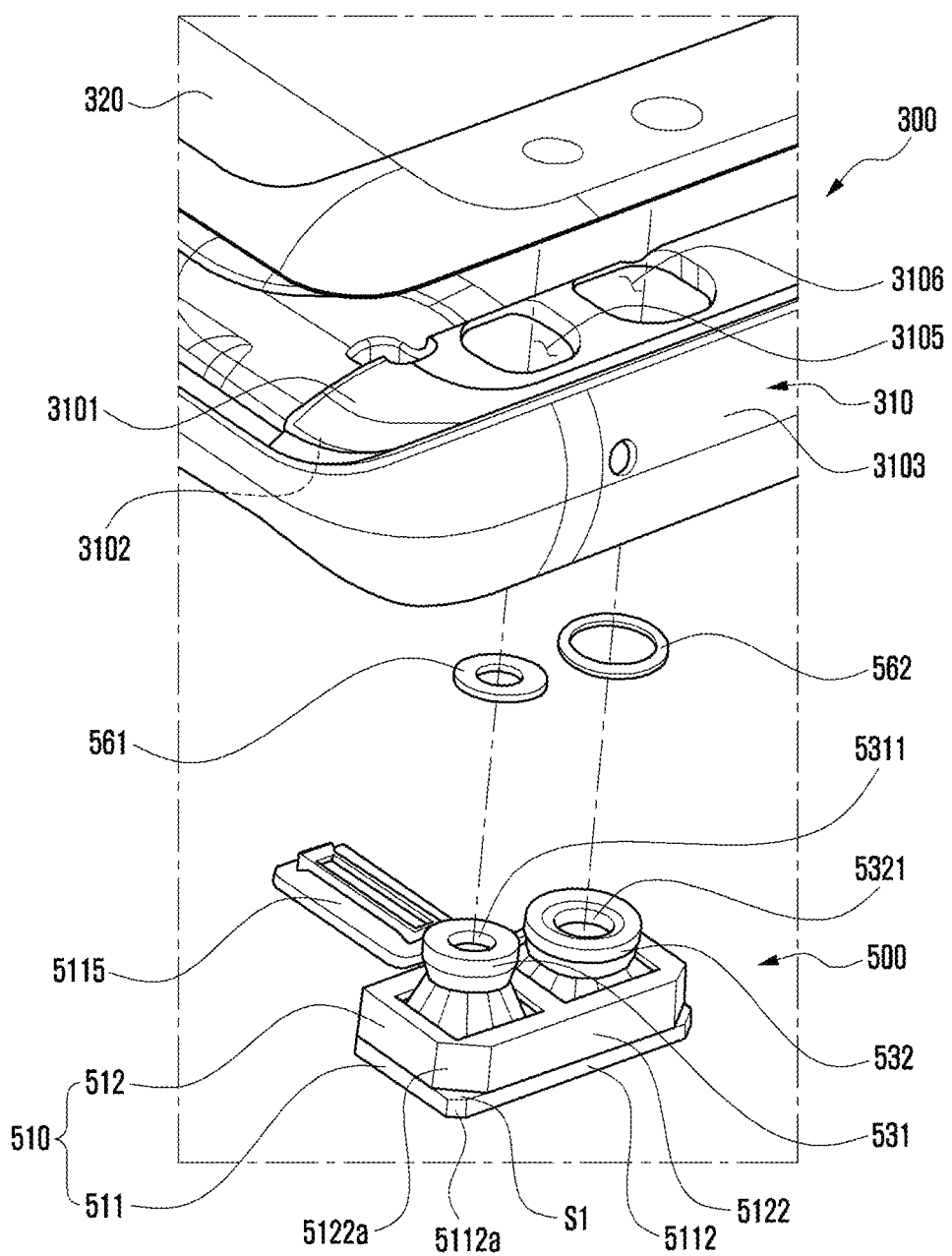
FIG. 4 illustrates an exploded perspective view of an electronic device in which a camera structure is disposed according to various embodiments of the disclosure.

FIG. 4 illustrates an exploded perspective view of an electronic device 300 in which a camera structure 500 is disposed according to various embodiments of the disclosure.

The electronic device 300 of FIG. 4 may be at least partially similar to the electronic device 100 of FIGS. 1 and 2 or may further include other examples of the electronic device.

With reference to FIG. 4, the electronic device 300 may include a side member 310 (e.g., side bezel structure). According to one embodiment, the side member 310 may include a first surface 3101 on which a first plate 320 (e.g., front plate) is disposed, a second surface 3102 facing in a direction opposite to that of the first surface 3101 and in which a second plate (e.g., the rear surface of FIG. 3) is disposed, and a side surface 3103 enclosing a space between the first surface 3101 and the second surface 3102. According to one embodiment, when viewed from above the first plate 320, the side member 310 may include at least one of a first through-hole 3105 or a second through-hole 3106 formed from the first surface 3101 to the second surface 3102 facing in a direction opposite to the first surface 3101. According to one embodiment, the first through-hole 3105 and/or the second through-hole 3106 may receive at least part of the camera structure 500.

According to various embodiments, the camera structure 500 may be disposed at the second surface 3102 of the side member 310 and be disposed to expose at least part thereof at the first surface 3101 through the through holes 3105 and 3106. According to one embodiment, the camera structure 500 may include a camera housing structure 510. According to one embodiment, the camera housing structure 510 may include a first camera housing structure 511 or a second camera housing structure 512 coupled to the first camera housing structure 511. According to one embodiment, the first camera housing structure 511 and the second camera housing structure 512 may be integrally formed. According to one embodiment, when one surface of the side member 310 is viewed from the outside, the camera housing structure 510 may include a first side surface 5112 and/or a second side surface 5122 having a first stepped structure S1. According to one embodiment, the first camera housing structure 511 may include a first cutting portion 5112a formed in at least one corner portion of the first side surface 5112. According to one embodiment, the second camera housing structure 512 may include a second cutting portion 5122a connected to a corner portion of the first camera housing structure 511 and formed at a corner portion of the second side surface 5122. According to one embodiment, cutting amounts of the first and second cutting portions 5112a and 5122a may be different from each other. For example, the first stepped structure S1 may be formed such that a cutting amount of the second cutting portion 5122a is larger than that of the first cutting portion 5112a. In another embodiment, the first cutting portion 5112a may be omitted. In this case, the first stepped structure S1 may be determined by a cutting amount of the second cutting portion 5122a.

According to various embodiments, the camera structure 500 may include at least one of a first barrel member 531 or a second barrel member 532 disposed to expose at least part through an upper surface (e.g., the upper surface 5121 of FIG. 5A) of the camera housing structure 510. According to one embodiment, the at least one barrel member 531 and 532 may include at least one lens 5311 and 5321, respectively. According to one embodiment, when the camera structure 500 is disposed at the side member 310, the electronic device 300 may include sealants 561 and 562 disposed between the second surface 3102 of the side member 310 and at least one barrel member 531 and 532 of the camera structure 500. According to one embodiment, the sealants 561 and 562 may prevent foreign materials from entering from the outside and perform a shock absorbing action of protecting the camera structure 500 from an external impact. According to one embodiment, the sealants 561 and 562 may be formed with urethane foam (e.g., poron). According to one embodiment, the camera structure 500 may include a connector 5115 drawn out by a predetermined length from the camera housing structure 510. According to one embodiment, when the camera structure 500 is disposed at the side member 310, the connector 5115 may be connected to a connector port of a printed circuit board (e.g., the printed circuit board 340 of FIG. 3) disposed inside the electronic device 300 to be electrically connected thereto.

Figure 5A:
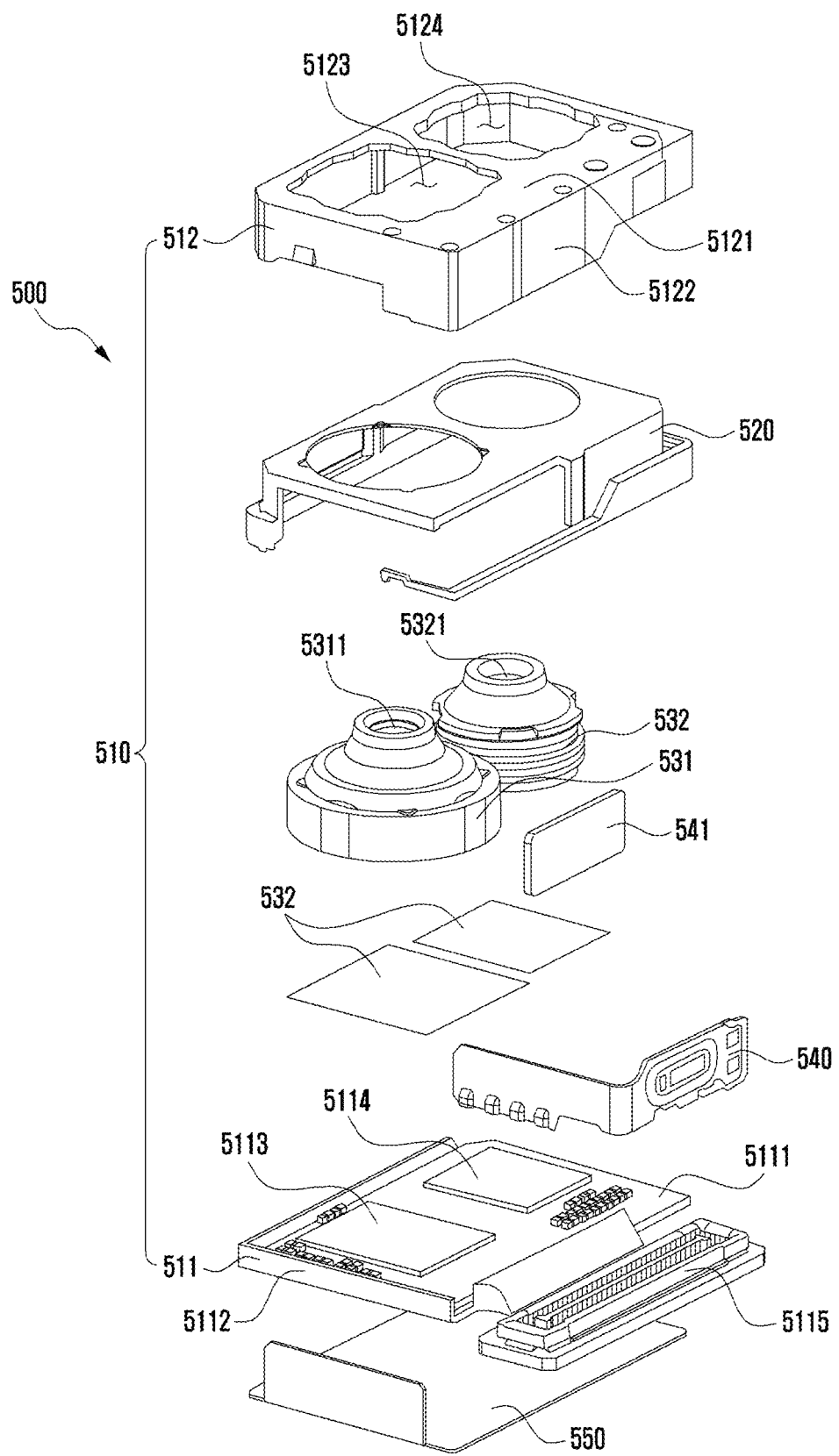
FIG. 5A illustrates an exploded perspective view of a camera structure according to various embodiments of the disclosure.

FIG. 5A illustrates an exploded perspective view of a camera structure 500 according to various embodiments of the disclosure.

With reference to FIG. 5A, the camera structure 500 may include a camera housing structure 510 including a first camera housing structure 511 and a second camera housing structure 512 coupled to the first camera housing structure 511. According to one embodiment, the camera housing structure 510 may include at least one of a base structure 5111, a first image sensor 5113, a second image sensor 5123, an actuator 540, a magnet 541, at least one infrared film 532, a first barrel member 531, a second barrel member 532, a first lens 5311, and/or a second lens 5321 disposed in an internal space. In another embodiment, the camera structure 500 may include three or more image sensors, three or more lenses, and/or three or more barrel members. According to one embodiment, the camera structure 500 may further include an intermediate housing structure 520 additionally disposed inside the second camera housing structure 512.

According to various embodiments, the base structure 5111 may be disposed in the first camera housing structure 511. According to one embodiment, the base structure 5111 may include a camera substrate (e.g., printed circuit board) in which at least one image sensor 5113 and 5123 and/or a plurality of electrical elements are mounted. According to one embodiment, at least one image sensor 5113 and 5114 may be disposed with the number corresponding to at least one barrel member 531 and 532, respectively. In another embodiment, the first image sensor 5113 or the second image sensor 5114 may be formed in one integral image sensor so as to correspond to the first barrel member 531 or the second barrel member 532. According to one embodiment, the camera structure 500 may include a connector 5115 drawn out from the base structure 5111. According to one embodiment, the connector 5115 may be drawn out by a predetermined length from the camera structure 500 through a flexible printed circuit board (FPCB) and be connected to a connector port disposed at a printed circuit board (e.g., the printed circuit board 340 of FIG. 3) of the electronic device (e.g., the electronic device 300 of FIG. 3).

According to various embodiments, at least one barrel member 531 and 532 may be disposed to expose at least part thereof through at least one opening 5123 and 5124 formed in the upper surface 5121 of the second camera housing structure 512. According to one embodiment, the at least one barrel member 531 and 532 may include at least one lens 5311 and 5321, respectively, and be disposed to face a direction of a first plate (e.g., the first plate 320 of FIG. 4) through the openings 5123 and 5124. According to one embodiment, the actuator 540 and/or the magnet 541 may be disposed at one side of the at least one barrel member 531 and 532 in a space formed by the first camera housing structure 511 and the second camera housing structure 512 and be used to perform an auto focus (AF) function of the camera structure 500. According to one embodiment, the actuator 540 may include a voice coil motor (VCM) for moving at least part of at least one barrel member 531 and 532. According to one embodiment, the camera structure 500 may include a protective tape 550 attached to a rear surface of the first camera housing structure 511.

Figure 5B:
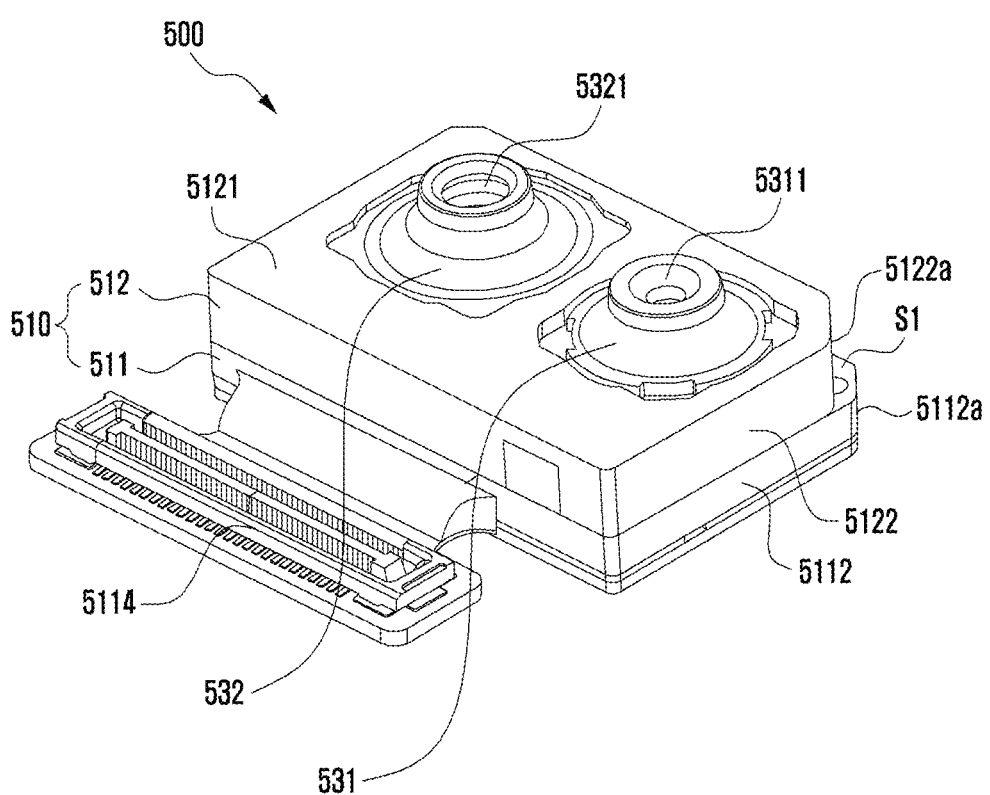
FIG. 5B illustrates a coupled perspective view of a camera structure according to various embodiments of the disclosure.

FIG. 5B illustrates a coupled perspective view of a camera structure 500 according to various embodiments of the disclosure.

With reference to FIG. 5B, the camera structure 500 may include a camera housing structure 510. According to one embodiment, in the camera structure 500, a first stepped structure S1 may be provided through a shape change of the first camera housing structure 511 and the second camera housing structure 512 of the camera housing structure 510. According to one embodiment, the first stepped structure S1 may be disposed in at least one corner portion of the camera structure 500. The first stepped structure S1 may guide to form a second stepped structure (e.g., a second stepped structure S2 of FIG. 6) to be described later formed in a portion (e.g., a portion P of FIG. 6) facing a side member 310 (e.g., a side member 310 of FIG. 6).

According to various embodiments, the first camera housing structure 511 may include a first cutting portion 5112a formed in at least one corner portion of the first side surface 5112. According to one embodiment, the second camera housing structure 512 may include a second cutting portion 5122a connected to a corner portion of the first camera housing structure 511 and formed in at least one corner portion of the second side surface 5122. According to one embodiment, cutting amounts of the first cutting portion 5112a and the second cutting portion 5122a may be different from each other. For example, a cutting amount of the second cutting portion 5122a may be larger than that of the first cutting portion 5112a. According to one embodiment, the first stepped structure S1 may be formed by the second cutting portion 5122a of the second camera housing structure 512 formed to have a larger cutting amount than that of the first cutting portion 5112a of the first camera housing structure 511. According to one embodiment, the first stepped structure S1 may guide a part (e.g., the portion P of FIG. 6) of a corner of the side member (e.g., the side member 310 of FIG. 6) into a corresponding shape to enable the part to have at least partially a thicker thickness, thereby helping to reinforce rigidity of the electronic device (e.g., the electronic device 300 of FIG. 3). In another embodiment, the first camera housing structure 511 and the second camera housing structure 512 may be integrally formed. In another embodiment, the first cutting portion 5112a of the first camera housing structure 511 may be omitted.

Figure 6:
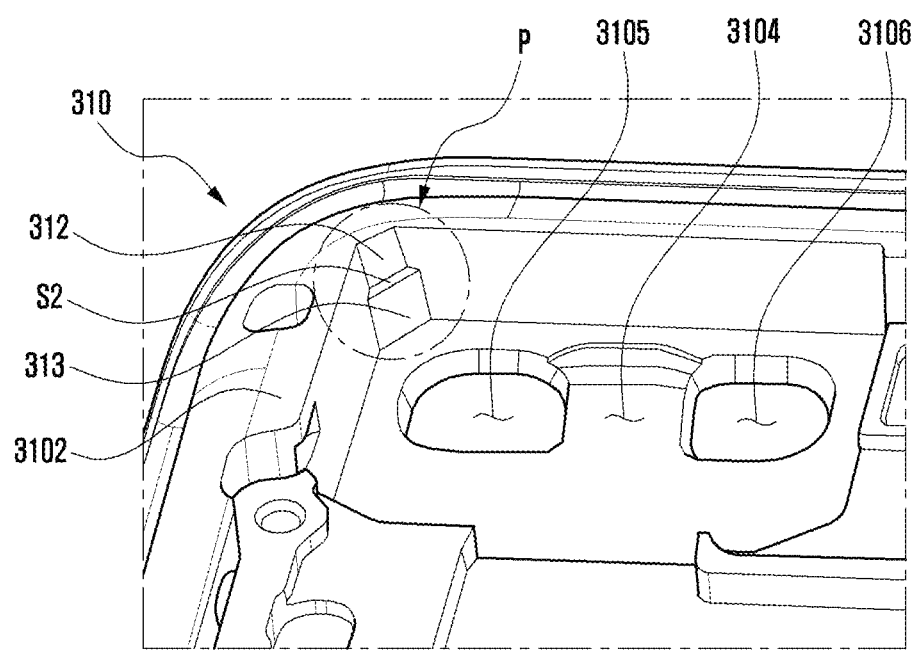
FIG. 6 illustrates a partial perspective view of a side member including a camera mounting portion according to various embodiments of the disclosure.

FIG. 6 illustrates a partial perspective view of a side member 310 including a camera mounting portion 3104 according to various embodiments of the disclosure.

With reference to FIG. 6, the side member 310 may include a camera mounting portion 3104 formed to mount a camera structure (e.g., the camera structure 500 of FIG. 4). According to one embodiment, the camera mounting portion 3104 may include at least one of a first through-hole 3105 and/or a second through-hole 3106 formed to penetrate from the second surface 3102 to the first surface 3101. According to one embodiment, when the camera structure 500 is mounted through the camera mounting portion 3104, at least part of at least one barrel member (e.g., at least one barrel member 531 and 532 of FIG. 4) may be disposed to be exposed at the first surface 3101 through the first through-hole 3105 and/or the second through-hole 3106. According to one embodiment, the camera mounting portion 3104 may be disposed in a corner portion of the side member 310. This may be required for efficient disposition of a display requiring a large screen (e.g., the display 330 of FIG. 3).

According to various embodiments, the side member 310 may include a portion P disposed at a corner of the camera mounting portion 3104. According to one embodiment, the portion P may include a first portion 312 protruded with a first protruding amount from a corner portion toward the camera mounting portion 3104 and a second portion 313 protruded with a protruding amount greater than the first protruding amount. According to one embodiment, when the camera structure (e.g., the camera structure 500 of FIG. 4) is mounted, the first portion 312 of the portion P of the side member 310 may be correspondingly formed to face the first cutting portion (e.g., the first cutting portion 5112a of FIG. 4) of the camera structure (e.g., the camera structure 500 of FIG. 4). According to one embodiment, the second portion 313 may be correspondingly formed to face the second cutting portion (e.g., the second cutting portion 5122a of FIG. 4) of the camera structure (e.g., the camera structure 500 of FIG. 4). Therefore, the portion P of the side member 310 may include a second stepped structure S2 formed at a boundary area of the first portion 312 and the second portion 313. For example, the second stepped structure S2 may be formed in a shape corresponding to the first stepped structure (e.g., the first stepped structure S1 of FIG. 4).

Figure 7A:
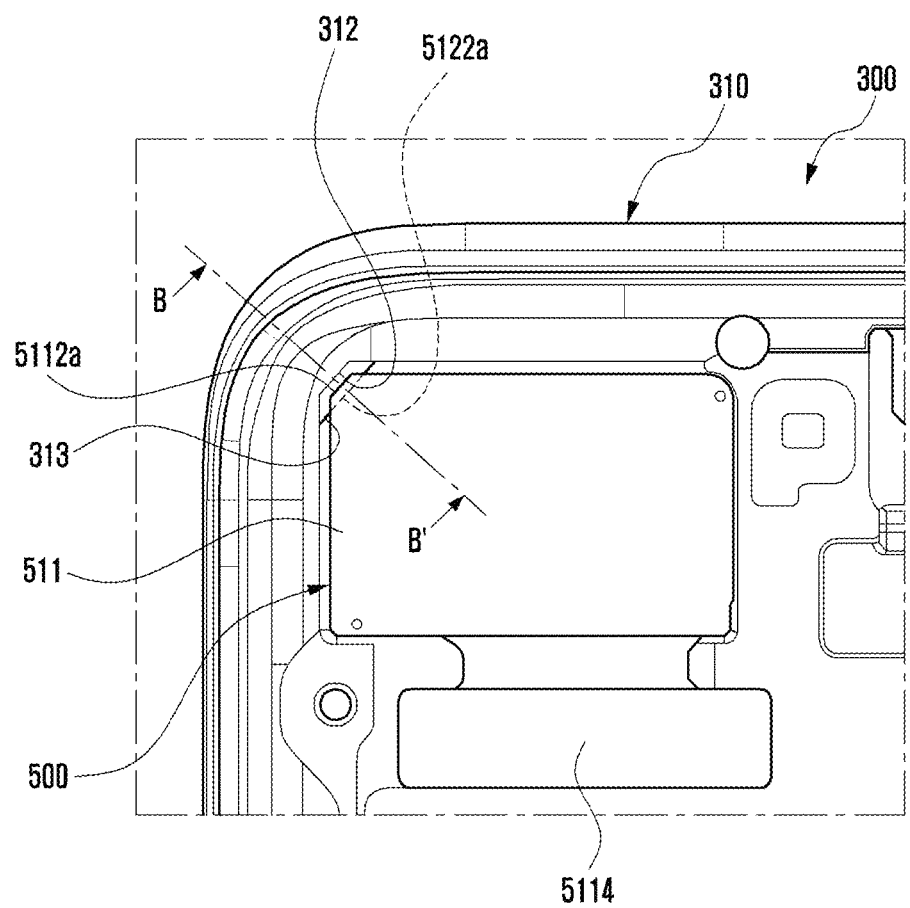
FIG. 7A illustrates a partial plan view of a camera structure disposed at a side member according to various embodiments of the disclosure.
Figure 7B:
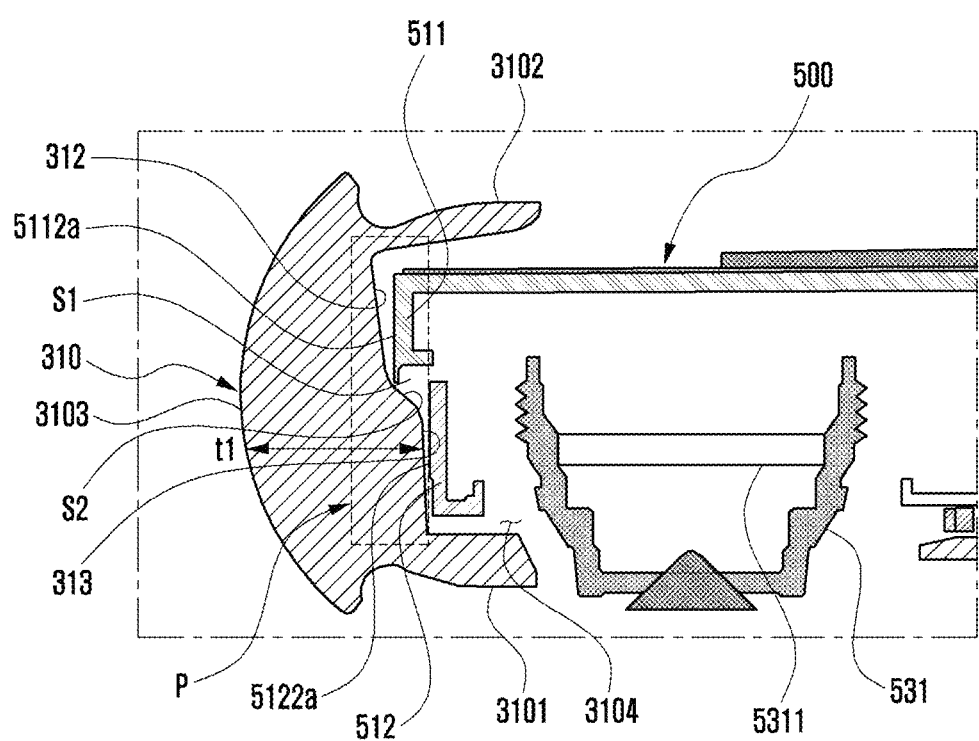
FIG. 7B illustrates a partial cross-sectional view of a camera structure disposed at a side member according to various embodiments of the disclosure.

FIG. 7A illustrates a partial plan view of a camera structure 500 disposed at a side member 310 according to various embodiments of the disclosure. FIG. 7B illustrates a partial cross-sectional view of a camera structure 500 disposed at a side member 310 according to various embodiments of the disclosure.

FIG. 7B illustrates a cross-sectional view taken along line B-B' of FIG. 7A.

With reference to FIGS. 7A and 7B, the electronic device 300 may include a side member 310 and a camera structure 500 disposed in at least part of the side member 310. According to one embodiment, the camera structure 500 may be disposed so that the first stepped structure S1 of the camera structure 500 faces and is fitted together with the second stepped structure S2 formed in the portion P of the side member 310 at the camera mounting portion 3104 of the side member 310. For example, when the camera structure 500 is mounted in the side member 310, the first cutting portion 5112a of the camera structure 500 may be disposed to face a first portion 312 of the portion P of the side member 310. According to one embodiment, the second cutting portion 5122a of the camera structure 500 may be disposed to face the second portion 313 of the portion P of the side member 310.

According to various embodiments, at least part of the side member 310 may be formed to have a relatively thicker thickness than that of a periphery thereof by structural coupling of the first stepped structure S1 of the camera structure 500 and the second stepped structure S2 of the side member 310, which may help to reinforce rigidity of the electronic device 300. For example, as illustrated, when viewed from above the side member 310, a thickness t1 of an area (e.g., the second portion 313) in which the side member 310 is overlapped with the second cutting portion 5122a of the camera structure 500 may be formed to be relatively thicker than an area (e.g., the first portion 312) in which the side member 310 is overlapped with the first cutting portion 5112a of the camera structure 500.

Figure 8A:
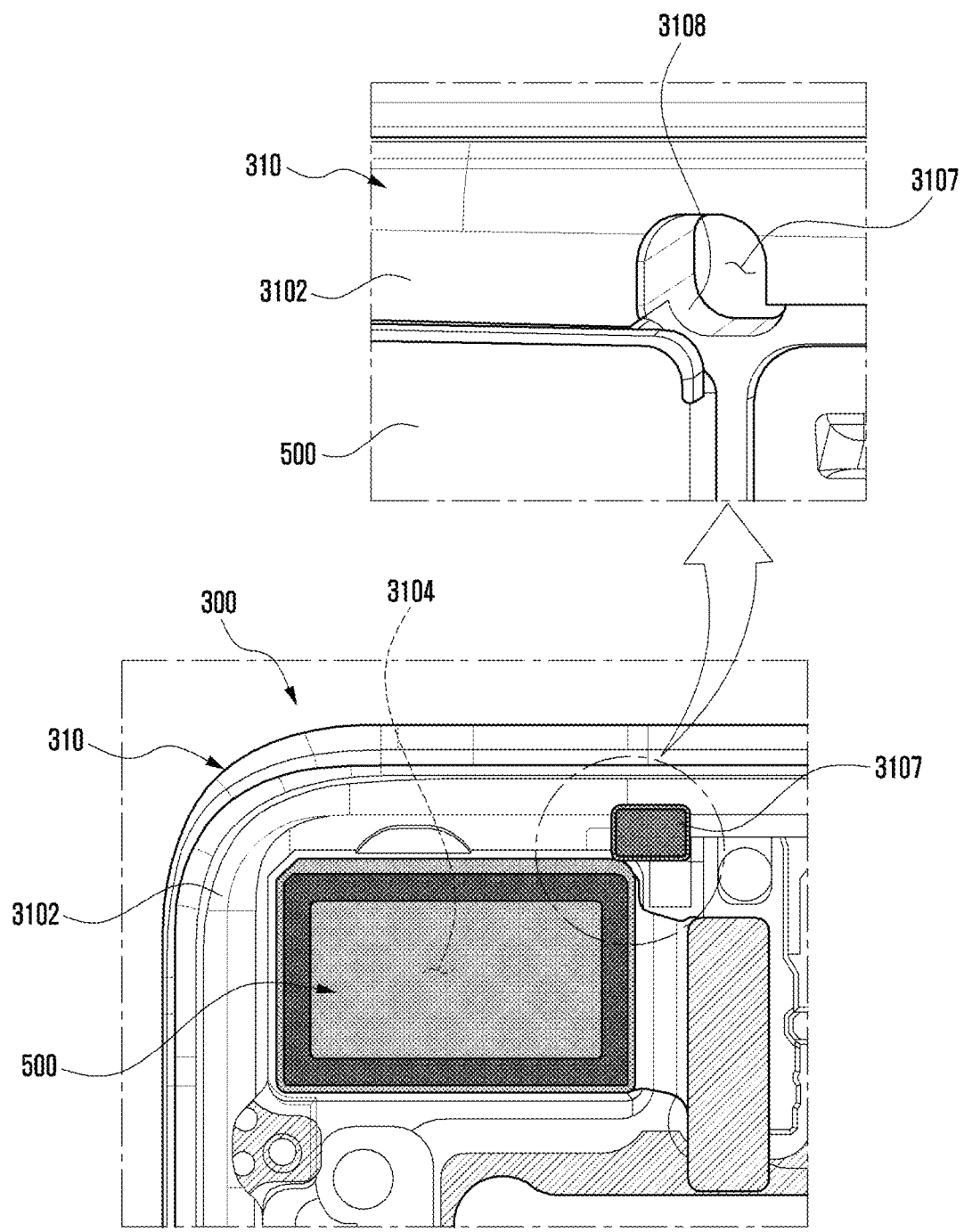
FIGS. 8A and 8B illustrate diagrams of a disposition relationship of a filling member injection hole and a camera structure according to various embodiments of the disclosure.
Figure 8B:
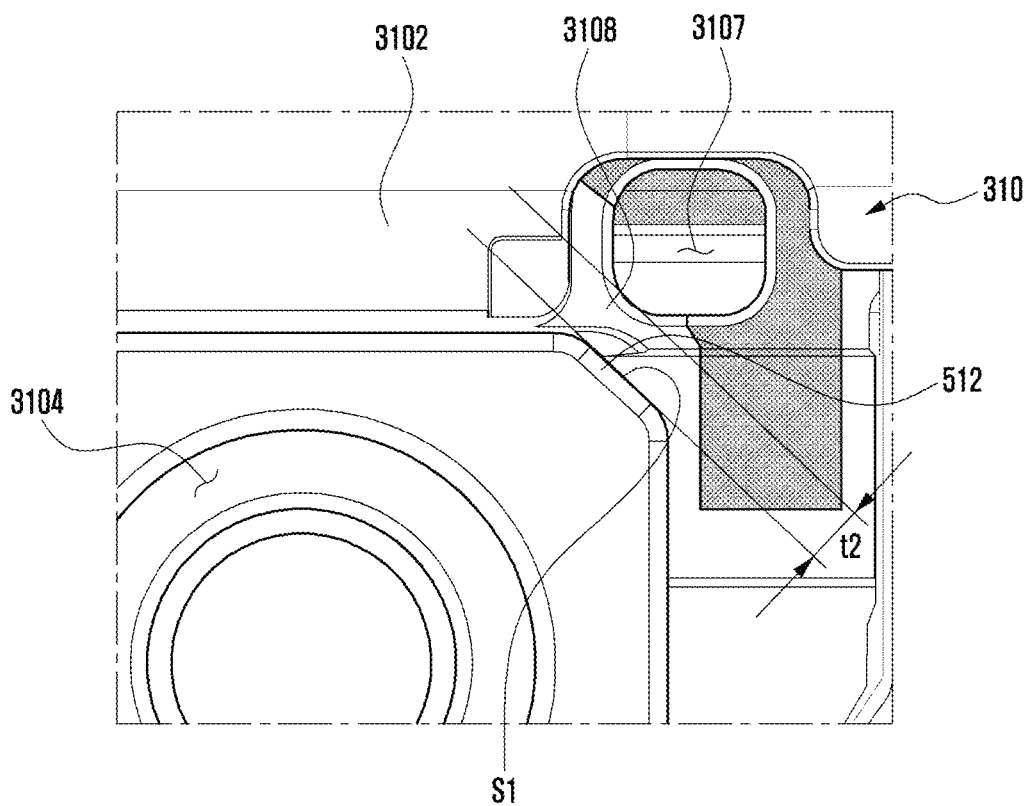

FIGS. 8A and 8B illustrate diagrams of a disposition relationship of a filling member injection hole 3107 and a camera structure 500 according to various embodiments of the disclosure.

FIG. 8A illustrates a diagram partially illustrating a state in which the camera structure 500 is disposed at a periphery of the filling member injection hole 3107 when viewed from above the second surface 3102 of the electronic device 300, and FIG. 8B illustrates a partially enlarged view illustrating a periphery of the filling member injection hole 3107 in a state in which the camera structure 500 is omitted when viewed from above the second surface 3102 of the electronic device.

According to various embodiments, by the first stepped structure S1 of the camera structure 500, a structural shape of a peripheral area of the side member 310 in which the camera structure 500 is disposed may be changed.

With reference to FIGS. 8A and 8B, the electronic device 300 may include a side member 310. According to one embodiment, the electronic device 300 may include a camera structure 500 disposed in the camera mounting portion 3104 formed at the second surface 3102 of the side member 310. According to one embodiment, the side member 310 may include a filling member injection hole 3107 (e.g., curved in place gasket (CIPG) hole) disposed at a periphery of the camera mounting portion 3104. According to one embodiment, the filling member injection hole 3107 may be used as an introduction hole of a waterproof filling member filled between a boundary area of the display (e.g., the display 330 of FIG. 3) and the side member 310 in order to prevent external moisture or foreign materials of the electronic device 300 from flowing into an internal space. According to one embodiment, the waterproof filling member may be injected from the second surface 3102 of the side member 310 toward the first surface 3101 through the filling member injection hole 3107. According to one embodiment, the waterproof filling member may include a semi-solid or liquid material and have a property of being solidified by natural or external conditions (e.g., heat, ultraviolet light, or pressure).

According to various embodiments, the filling member injection hole 3107 may be restricted in a layout design for a waterproof function of the electronic device 300. For example, when the filling member injection hole 3107 is to be disposed at a periphery (e.g., a substantially boundary area) of the camera mounting portion 3104, the first stepped structure S1 of the camera structure 500 may help to form a separation distance between the camera mounting portion 3104 and the filling member injection hole 3107 in which a disposition change is difficult. For example, as illustrated in FIG. 8B, the filling member injection hole 3107 may be formed to have a separation distance of a predetermined thickness t2 from the camera mounting portion 3104 through the first stepped structure S1 of the camera structure 500. For example, when the watertight filling member is injected through the filling member injection hole 3107, the first stepped structure S1 may prevent a phenomenon in which the watertight filling member overflows to a peripheral undesired area by a partition 3108 at least partially formed to have a separation distance.

Figure 9A:
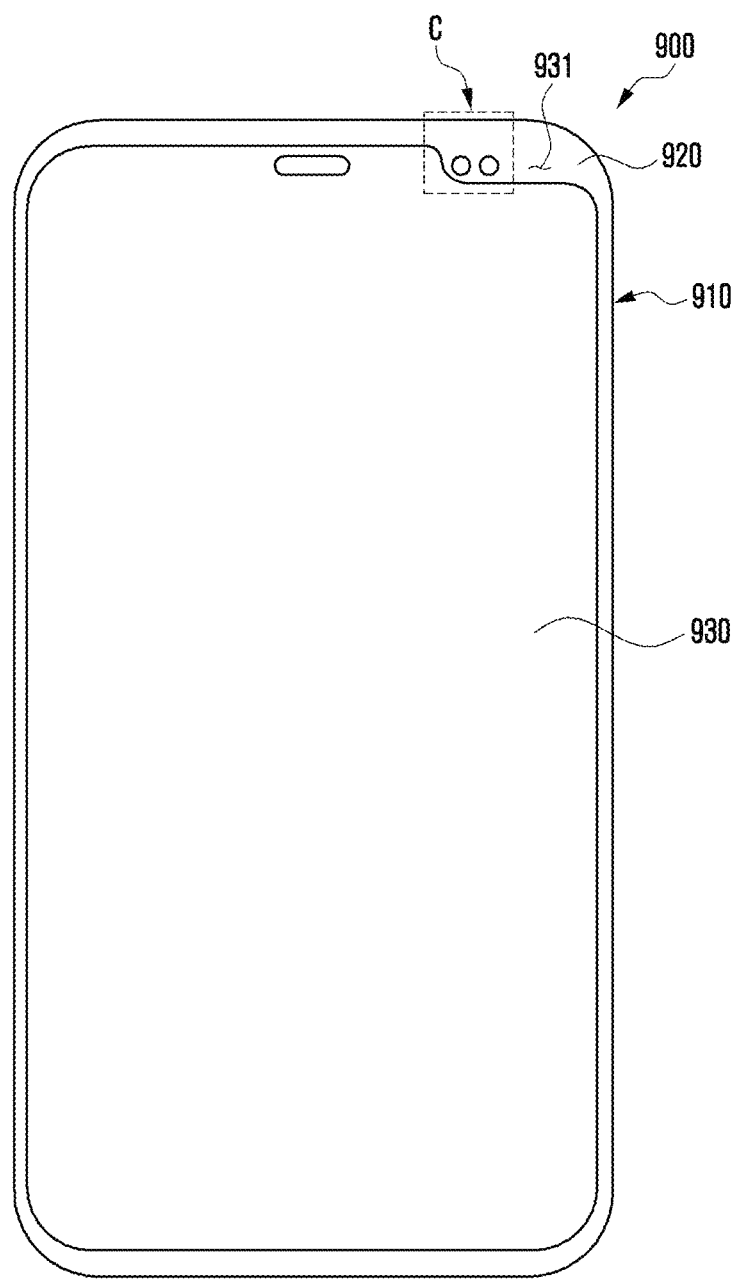
FIGS. 9A and 9B illustrate diagrams of a disposition relationship of a display and a camera structure according to various embodiments of the disclosure.
Figure 9B:
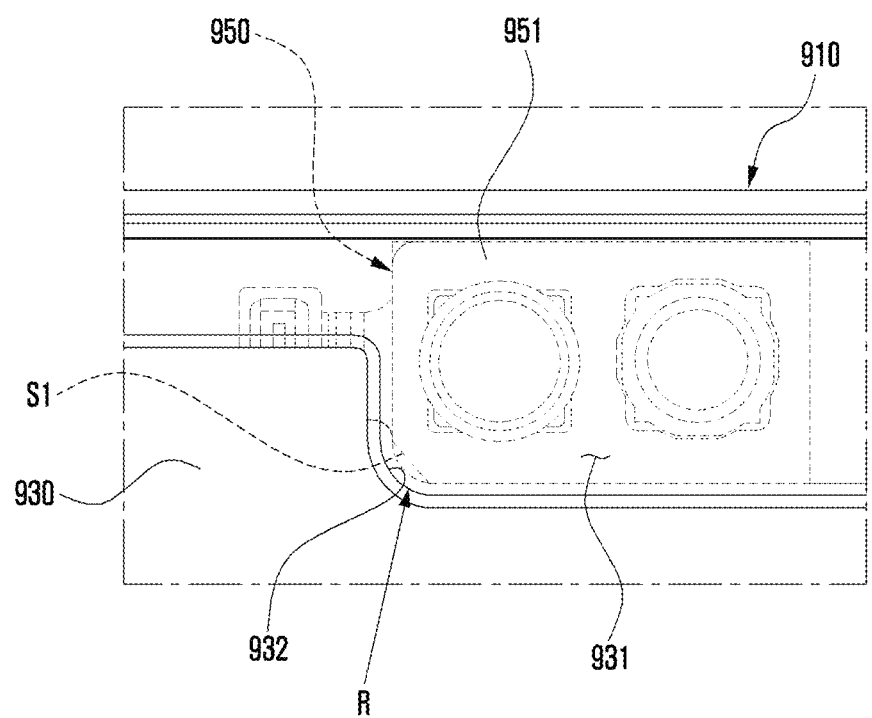

FIGS. 9A and 9B illustrate diagrams of a disposition relationship of a display 930 and a camera structure 950 according to various embodiments of the disclosure.

According to various embodiments, a structural shape of the camera structure 950 and the adjacent display 930 (e.g., the display 330 of FIG. 3) may be changed by the first stepped structure S1 (e.g., the first stepped structure S1 of FIG. 4) of the camera structure 950 (e.g., the camera structure 500 of FIG. 4).

With reference to FIGS. 9A and 9B, the electronic device 900 (e.g., the electronic device 300 of FIG. 4) may include a first plate 920 (e.g., the first plate 320 of FIG. 4) (e.g., front plate) disposed at a housing 910 (e.g., the side member 310 of FIG. 4) and a display 930 (e.g., the display 330 of FIG. 3) disposed so that at least some areas are visible from the outside through the first plate 920 in an inner space of the housing 910. According to one embodiment, the electronic device 900 may include a camera structure 950 disposed to expose at least part thereof through the first plate 920 in an area other than a disposition area of the display 930. According to one embodiment, the camera structure 950 may be disposed at a periphery of at least some area of an end portion of one side of the display 930, whereby the display 930 may include a notch area 931 that avoids the camera structure 950. According to one embodiment, in the display 930, at least one corner portion may be formed through the notch area 931, and the corner portion may be a starting point of breakage generated when processing the display 930 or by an external impact.

According to various embodiments, a first stepped structure S1 formed in a camera housing structure 951 (e.g., the camera housing structure 510 of FIG. 4) of the camera structure 950 may be disposed to face a corner portion 932 of the notch area 931. In this case, the corner portion 932 formed in the notch area 931 of the display 930 through the first stepped structure S1 may be formed to have a gentler and larger radius of curvature R.

Figure 10:
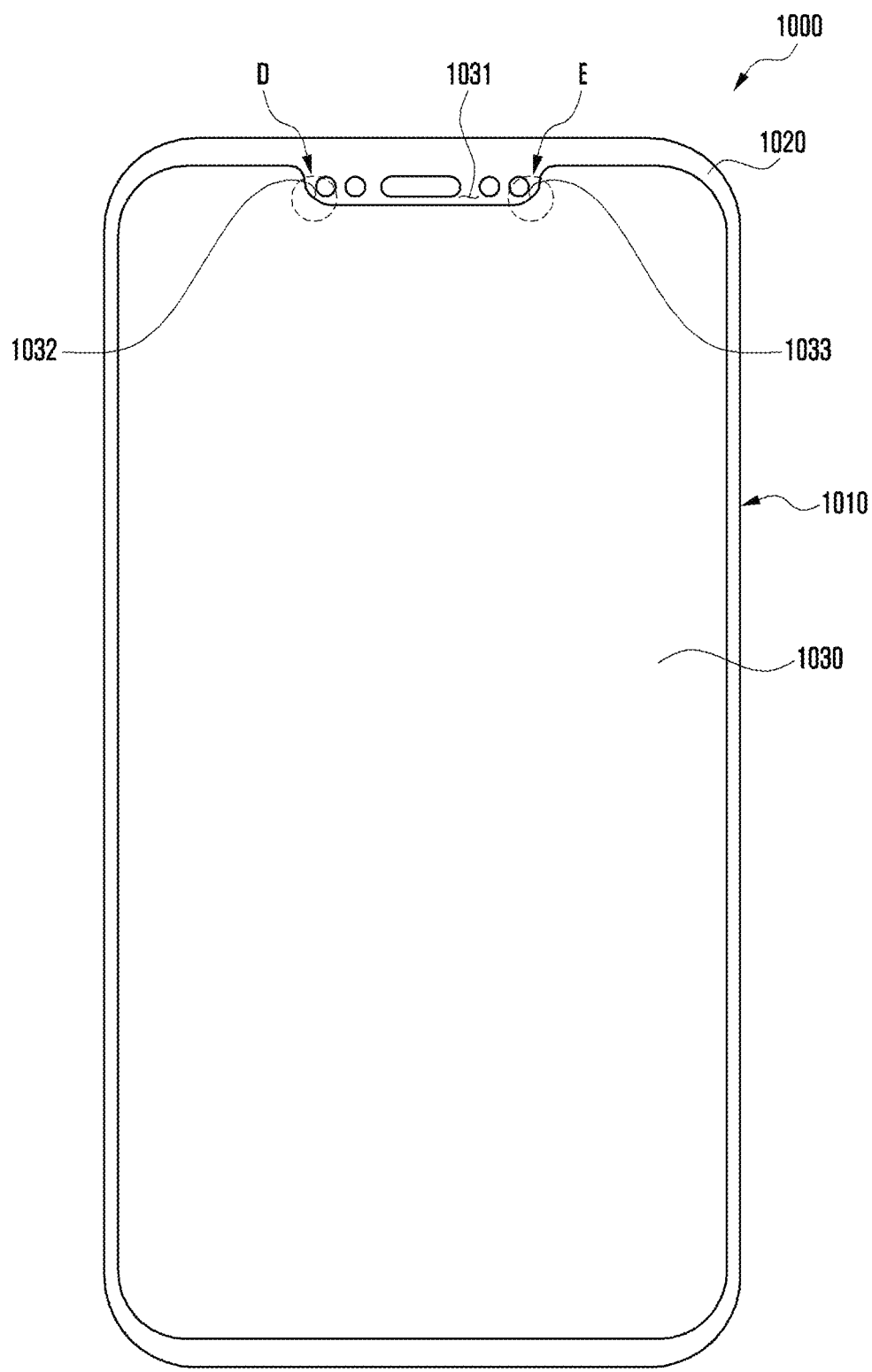
FIG. 10 illustrates a diagram of an electronic device including a display including a notch area according to various embodiments of the disclosure.

FIG. 10 illustrates a diagram of an electronic device 1000 including a display 1030 including a notch area 1031 according to various embodiments of the disclosure.

With reference to FIG. 10, the electronic device 1000 (e.g., the electronic device 300 of FIG. 4) may include a first plate 1020 (e.g., the first plate 320 of FIG. 4) (e.g., the front plate) disposed at a housing 1010 (e.g., the side member 310 of FIG. 4) and/or a display 1030 (e.g., the display 330 of FIG. 3) disposed so that at least some area is visible from the outside through the first plate 1020 in an space of the housing 1010. According to one embodiment, the electronic device 1000 may include a notch area 1031 disposed at the center of an upper portion thereof. The electronic device 1000 may include a camera structure (e.g., the camera structure 500 of FIG. 5A) disposed through the notch area 1031. According to one embodiment, the notch area 1031 may be formed in a "U" shape.

According to various embodiments, corner portions 1032 and 1033 (e.g., D area and/or E area) of the notched area 1031 of the display 1030 may be formed to have a more smooth radius of curvature through the first stepped structure S1 of the camera structure (e.g., the camera structure 500 of FIG. 5A).

According to various embodiments of the disclosure, by correspondingly changing a thickness of a housing disposed at a periphery through a shape change of the camera structure, self-rigidity of an electronic device can be increased, and other peripheral electronic components can be efficiently disposed.

According to various embodiments, an electronic device (e.g., the electronic device 300 of FIG. 4) includes a housing (e.g., the housing 110 of FIG. 1) including a first plate (e.g., the first plate 320 of FIG. 4), a second plate (e.g., the second plate 380 of FIG. 3) facing in a direction opposite to that of the first plate, and a side member (e.g., the side member 310 of FIG. 4) enclosing a space between the first plate and the second plate; and a camera structure (e.g., the camera structure 500 of FIG. 4) disposed at the space at a periphery of a portion (e.g., the portion P of FIG. 6) of the side member, wherein the camera structure includes a camera housing structure (e.g., the camera housing structure 510 of FIG. 4) disposed between the first plate and the second plate; at least one image sensor (e.g., the image sensor 5113 of FIG. 5A) disposed in the camera housing structure; and at least one lens (e.g., at least one lens 5311 and 5321 of FIG. 4) disposed in the camera housing structure between the at least one image sensor and the first plate and facing the first plate, wherein the camera housing structure includes a side surface (e.g., the side surface 3103 of FIG. 4) facing the portion of the side member and having a first stepped structure (e.g., the first stepped structure S1 of FIG. 4) when one surface of the side surface is viewed from the outside, and wherein the portion of the side member has a second stepped structure (e.g., the second stepped structure S2 of FIG. 6) formed to correspond to the first stepped structure.

According to various embodiments, the camera housing structure may include a first camera housing structure (e.g., the first camera housing structure 511 of FIG. 5A) disposed between the first plate and the second plate; and a second camera housing structure (e.g., the second camera housing structure 512 of FIG. 5A) disposed between the first camera housing structure and the first plate, wherein the at least one image sensor may be disposed inside the first camera housing structure, wherein the at least one lens may be disposed inside the second camera housing structure, and wherein a side surface (e.g., the first side surface 5112 of FIG. 5A) of the first camera housing structure and a side surface (e.g., the second side surface 5122 of FIG. 5A) of the second housing structure may together form the first stepped structure.

According to various embodiments, the electronic device may further include at least one barrel member (e.g., at least one column member 531 and 532 of FIG. 5A) disposed inside the second camera housing structure, wherein the at least one lens may be disposed in the at least one barrel member.

According to various embodiments, at least part of the at least one barrel member may be disposed to be exposed through at least one opening (e.g., at least one opening 5123 and 5124 of FIG. 5A) formed in the second camera housing structure.

According to various embodiments, the electronic device may further include a first cutting portion (e.g., the first cutting portion 5112a of FIG. 4) formed to have a first cutting amount at one side corner of the side surface of the first camera housing structure; and a second cutting portion (e.g., the second cutting portion 5122a of FIG. 4) formed to have a second cutting amount larger than the first cutting amount at a corner connected to the first cutting portion of the side surface of the second camera housing structure, wherein the first stepped structure may be formed by a difference between the first cutting amount of the first cutting portion and the second cutting amount of the second cutting portion.

According to various embodiments, the side member may include a first surface (e.g., the first surface 3101 of FIG. 4) facing the first plate; a second surface (e.g., the second surface 3102 of FIG. 4) facing the second plate; a side surface (e.g., the side surface 3103 of FIG. 4) formed to enclose a space between the first surface and the second surface; and a camera mounting portion (e.g., the camera mounting portion 3104 of FIG. 6) formed at the second surface and including at least one through-hole (e.g., at least one through-hole 3105 and 3106 of FIG. 4) penetrated from the first surface to the second surface, wherein the camera structure may be mounted in the camera mounting portion, and at least part of the camera structure may be disposed to be exposed at the first surface through the at least one through-hole.

According to various embodiments, the second stepped structure may be formed at one side corner of the camera mounting portion.

According to various embodiments, the second stepped structure may include a first portion (e.g., the first portion 312 of FIG. 6) formed to face the first cutting portion; and a second portion (e.g., the second portion 313 of FIG. 6) formed to face the second cutting portion, wherein when the camera structure is mounted in the camera mounting portion, the first stepped structure may be disposed to fit together with the second stepped structure.

According to various embodiments, the first stepped structure may be formed by a cutting portion (e.g., the second cutting portion 5122a of FIG. 4) formed in an inner direction further than a corner of a corresponding first camera housing structure at one side corner of a side surface of the second camera housing structure.

According to various embodiments, the first camera housing structure may be formed integrally with the second camera housing structure.

According to various embodiments, when viewed from above the first plate, the portion of the side member may be disposed at a corner of the first plate.

According to various embodiments, the side member may further include a filling member injection hole (e.g., the filling member injection hole 3107 of FIG. 8A) for injecting a waterproof filling member disposed adjacent to the second stepped structure.

According to various embodiments, the electronic device may further include a display (e.g., the display 330 of FIG. 3) disposed in the space to be visible through the first plate.

According to various embodiments, the electronic device (e.g., the electronic device 300 of FIG. 4) includes a housing (e.g., the housing 110 of FIG. 1) including a first plate (e.g., the first plate 320 of FIG. 4), a second plate (e.g., the second plate 380 of FIG. 3) facing in a direction opposite to that of the first plate, a side member (e.g., the side member 310 of FIG. 4) enclosing a space between the first plate and the second plate; and a camera structure (e.g., the camera structure 500 of FIG. 4) disposed in the space at a periphery of a portion (e.g., the portion P of FIG. 6) of the side member, wherein the camera structure includes a camera housing structure (e.g., the camera housing structure 510 of FIG. 4) disposed between the first plate and the second plate; at least one image sensor (e.g., the image sensor 5113 of FIG. 5A) disposed in the camera housing structure; and at least one lens (e.g., at least one lens 5311 and 5321 of FIG. 4) disposed in the camera housing structure between the at least one image sensor and the first plate and facing the first plate, and wherein the camera housing structure includes a side surface (e.g., the first side surface 5112 and the second side surface 5122 of FIG. 4) facing the portion of the side member and having a first stepped structure (e.g., the first stepped structure S1 of FIG. 4) when one surface of the side member is viewed from the outside; and at least one electronic component disposed through the first stepped structure at a periphery of the camera structure in the space.

According to various embodiments, the camera housing structure includes a first camera housing structure (e.g., the first camera housing structure 511 of FIG. 5A) disposed between the first plate and the second plate; and a second camera housing structure (e.g., the second camera housing structure 512 of FIG. 5A) disposed between the first camera housing structure and the first plate, wherein the at least one image sensor is disposed inside the first camera housing structure, wherein the at least one lens is disposed inside the second camera housing structure, and wherein a side surface (e.g., the first side surface 5112 of FIG. 5A) of the first camera housing structure and a side surface (e.g., the second side surface 5122 of FIG. 5A) of the second camera housing structure form together the first stepped structure.

According to various embodiments, the first camera housing structure may be formed integrally with the second camera housing structure.

According to various embodiments, the portion of the side member may be disposed at a corner of the first plate, when viewed from above the first plate.

According to various embodiments, the electronic device may further include a display (e.g., the display 930 of FIG. 9A) disposed in the space to be visible through the first plate (e.g., the first plate 920 of FIG. 9A), wherein the display may include a notch area (e.g., the notch area 931 of FIG. 9B) including an inner corner (e.g., the inner corner 932 of FIG. 9B) formed to dispose the camera structure (e.g., the camera structure 950 of FIG. 9B).

According to various embodiments, the inner corner may be disposed to face the first stepped structure of the camera structure, wherein the inner corner may be formed in a curve shape having a radius of curvature (e.g., the radius of curvature R of FIG. 9B) to receive the first stepped structure.

According to various embodiments, the at least one electronic component may include at least one of an iris sensor, illuminance sensor, ultrasonic sensor, speaker device, microphone device, or ear jack assembly.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
 a housing comprising a first plate, a second plate facing in a direction opposite to that of the first plate, and a side member enclosing a space between the first plate and the second plate, wherein the side member comprises:
  a first surface facing the first plate,
  a second surface facing the second plate,
  a side surface configured to enclose a space between the first surface and the second surface, and
  a camera mounting portion formed at the second surface and comprising at least one through-hole penetrated from the first surface to the second surface; and
 a camera structure mounted in the camera mounting portion, and at least part of the camera structure is disposed to be exposed at the first surface through the at least one through-hole,
 wherein the camera structure comprises:
  a camera housing structure disposed between the first plate and the second plate and including:
  a first camera housing structure disposed between the first plate and the second plate and including a first cutting portion formed to have a first cutting amount at one side corner of a side surface of the first camera housing structure,
  a second camera housing structure disposed between the first camera housing structure and the first plate and including a second cutting portion formed to have a second cutting amount larger than the first cutting amount at a corner connected to the first cutting portion of a side surface of the second camera housing structure, and
  a first stepped structure formed by a difference between the first cutting amount of the first cutting portion and the second cutting amount of the second cutting portion and facing a portion of the side member;
  at least one image sensor disposed inside the first camera housing structure; and
  at least one lens disposed inside the second camera housing structure,
  wherein the portion of the side member has a second stepped structure formed at one side corner of the camera mounting portion,
  wherein the second stepped structure comprises a first portion formed to face the first cutting portion and a second portion formed to face the second cutting portion, and
  wherein the first stepped structure is disposed to fit together with the second stepped structure when the camera structure is mounted in the camera mounting portion.

2. The electronic device of claim 1, further comprising: at least one barrel member disposed inside the second camera housing structure,
 wherein the at least one lens is disposed in the at least one barrel member.

3. The electronic device of claim 2, wherein at least part of the at least one barrel member is disposed to be exposed through at least one opening formed in the second camera housing structure.

4. The electronic device of claim 1, wherein the first stepped structure is formed by a cutting portion formed in an inner direction further than a corner of a corresponding first camera housing structure at one side corner of the side surface of the second camera housing structure.

5. The electronic device of claim 1, wherein the first camera housing structure is formed integrally with the second camera housing structure.

6. The electronic device of claim 1, wherein the portion of the side member is disposed at a corner of the first plate, when viewed from above the first plate.

7. The electronic device of claim 1, wherein the side member further comprises a filling member injection hole for injecting a waterproof filling member disposed adjacent to the second stepped structure.

8. The electronic device of claim 1, further comprising a display disposed in the space between the first plate and the second plate, wherein the display is visible through the first plate.

9. The electronic device of claim 8,
 wherein the display comprises a notch area comprising an inner corner formed to dispose the camera structure.

10. The electronic device of claim 9, wherein the inner corner is disposed to face the first stepped structure of the camera structure, and
 wherein the inner corner is formed in a curve shape having a radius of curvature to receive the first stepped structure.

* * * * *